UNITED STATES PATENT OFFICE.

NELSON A. CLASSON, OF WINDHAM, CONNECTICUT.

IMPROVEMENT IN PREPARING COCOA-NUT FOR USE IN PIES, CAKES, &c.

Specification forming part of Letters Patent No. 145,722, dated December 23, 1873; application filed December 5, 1873.

*To all whom it may concern:*

Be it known that I, N. A. CLASSON, of Windham, Connecticut, have invented a Process for Macerating Cocoa-Nut, of which the following is a specification:

The object of my invention is to produce an article for a dessert to be used in making pies, cakes, puddings, &c., and styled "Classon's Macerated Cocoa-Nut," and relates to that class of processes and compounds used to prepare and preserve cocoa-nut in a moist and natural state, and for an indefinite length of time. It consists in compounding and macerating one hundred (100) parts cocoa-nut, twenty-five (25) parts water, forty (40) parts powdered sugar, and one-twentieth ($\frac{1}{20}$) of one (1) part bicarbonate of soda.

In carrying out my invention, take fresh ground cocoa-nut and water, proper proportions, and place together in a retort, which is immersed in a vat of water which has been densified to highest boiling-point, (or muriatic-acid bath.) Heat the two ingredients to boiling-point, which liquefies the oil. The whole is then taken out and put under pressure, which extracts all the oil, milk, and water, leaving the pulp of the cocoa-nut entirely free from taste, oil, water, and milk. Keep the pulp of the cocoa-nut at a gentle heat to prevent any absorption of air. Take the oil, milk, and water thus extracted and place together in the retort and continue heating. When at or near the boiling-point, add the proportion of soda, which produces coagulation of the parts. Separate the coagulum from the oil, &c., by pressing through flannel. Add the proportion of sugar to the residue, and continue to boil until the water is all evaporated and the sugar united with the now boiling and purified oil and milk, which forms a rich and oily sirup, which is now added to the already heated cocoa-nut, and boiling continued from four (4) to six (6) hours, which thoroughly macerates the cocoa-nut; while at boiling heat, pack the same in glass jars or cans and hermetically seal.

I am aware patents have been granted for desiccating cocoa-nut, and that the process is to take ground cocoa-nut mixed with sugar, spread thinly on pans, and place in hot-air closets, and dried and crisped over on the outside. This process does not evaporate the air or expel the moisture, or act upon the oil or milk, as the latter contains large proportions of caseine, (which is highly putrescible,) but rather destroys by excessive heat the nutriment of the cocoa-nut by crisping on the outside, while the interior is yet moist with all the elements of decay and putrefaction. These must be expelled, to permanently preserve the same. The fact that damp stores, sea air, or continued damp weather will convert this desiccated cocoa-nut into a putrid mass is sufficient proof of the above theory. I am also aware that attempts have been made to preserve cocoa-nut in a moist and natural state by the same or similar process used for canning fruits and meats; but, so far as I can ascertain, all such attempts have thus far proved unsuccessful.

I claim as my invention—

The preserving of cocoa-nut in a moist and natural state by the process hereinbefore set forth, and for the purpose specified.

N. A. CLASSON.

Witnesses:
JOHN M. HALL,
WM. H. PINER.